United States Patent
Robert Jose et al.

(10) Patent No.: US 12,518,112 B2
(45) Date of Patent: *Jan. 6, 2026

(54) METHODS AND SYSTEMS FOR RESPONDING TO A NATURAL LANGUAGE QUERY

(71) Applicant: Adeia Guides Inc., San Jose, CA (US)

(72) Inventors: Jeffry Copps Robert Jose, Tamil Nadu (IN); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 246 days.

This patent is subject to a terminal disclaimer.

(21) Appl. No.: 17/556,571

(22) Filed: Dec. 20, 2021

(65) Prior Publication Data

US 2023/0196033 A1 Jun. 22, 2023

(51) Int. Cl.
*G06F 40/42* (2020.01)

(52) U.S. Cl.
CPC .................. *G06F 40/42* (2020.01)

(58) Field of Classification Search
CPC ......... G06F 40/42; G06F 40/30; G06N 20/00; G06N 3/08; G06N 5/022
See application file for complete search history.

(56) References Cited

U.S. PATENT DOCUMENTS

| | | | |
|---|---|---|---|
| 9,679,568 B1 | 6/2017 | Taubman et al. | |
| 10,417,345 B1 | 9/2019 | Carlson et al. | |
| 10,482,182 B1 * | 11/2019 | Jankowski, Jr. | ........ G06F 40/30 |
| 10,706,846 B1 * | 7/2020 | Barton | .................. G10L 15/063 |
| 11,132,509 B1 * | 9/2021 | Pasko | .................. G06F 18/214 |
| 2002/0103429 A1 | 8/2002 | Decharms | |
| 2005/0097188 A1 | 5/2005 | Fish | |
| 2012/0272185 A1 * | 10/2012 | Dodson | .............. H04N 21/4821 |
| | | | 715/810 |
| 2013/0211238 A1 | 8/2013 | Decharms | |
| 2013/0275875 A1 | 10/2013 | Gruber et al. | |
| 2014/0171133 A1 * | 6/2014 | Stuttle | ..................... H04L 51/04 |
| | | | 455/466 |
| 2015/0094088 A1 | 4/2015 | Chen | |
| 2015/0186381 A1 | 7/2015 | Yan et al. | |

(Continued)

FOREIGN PATENT DOCUMENTS

| | | |
|---|---|---|
| KR | 20080024138 A | 3/2008 |
| KR | 20090039405 A | 4/2009 |
| WO | 2021173217 A1 | 9/2021 |

OTHER PUBLICATIONS

U.S. Appl. No. 17/556,585, filed Dec. 20, 2021, Jeffry Copps Robert Jose.

*Primary Examiner* — Darioush Agahi
(74) *Attorney, Agent, or Firm* — HALEY GUILIANO LLP

(57) ABSTRACT

Systems and methods are provided herein for training a natural language understanding model. A natural language query, e.g., a first natural language query, is received. A first natural language understanding model is used to process the natural language query. A confidence level, e.g., a first confidence level, of the understanding of the natural language query is determined. In response to the confidence level being below a confidence level threshold, the natural language query is reprocessed using a reprocessing module, e.g., after providing a response to the natural language query. The first natural language model is updated based on the reprocessing of the natural language query.

12 Claims, 8 Drawing Sheets

(56) References Cited

U.S. PATENT DOCUMENTS

| | | |
|---|---|---|
| 2015/0287413 A1* | 10/2015 | Jung .................. G10L 15/32 |
| | | 704/231 |
| 2016/0078131 A1 | 3/2016 | Venugopal et al. |
| 2016/0148612 A1 | 5/2016 | Guo et al. |
| 2018/0308491 A1* | 10/2018 | Oktem ................ G10L 15/063 |
| 2019/0130904 A1* | 5/2019 | Homma ................ G10L 15/18 |
| 2019/0317941 A1* | 10/2019 | Razallian ............. G06F 16/148 |
| 2020/0082829 A1* | 3/2020 | Taubman ............... G10L 15/30 |
| 2020/0302919 A1 | 9/2020 | Greborio et al. |
| 2020/0380980 A1 | 12/2020 | Shum et al. |
| 2020/0382464 A1 | 12/2020 | Keller |
| 2021/0034663 A1 | 2/2021 | Aher et al. |
| 2021/0157870 A1 | 5/2021 | Di Fabbrizio et al. |
| 2021/0183392 A1 | 6/2021 | Lee et al. |
| 2021/0241758 A1* | 8/2021 | Mukherjee ............. G06F 3/167 |
| 2021/0249002 A1 | 8/2021 | Ahmadidaneshashtiani et al. |
| 2021/0264116 A1 | 8/2021 | Thor et al. |
| 2021/0382925 A1 | 12/2021 | Fincun et al. |
| 2022/0036200 A1* | 2/2022 | Ma ....................... G06N 20/20 |
| 2022/0114040 A1 | 4/2022 | Kumar et al. |
| 2022/0206918 A1* | 6/2022 | Lerner ................ G06F 11/3041 |
| 2022/0222489 A1 | 7/2022 | Liu et al. |
| 2022/0351722 A1 | 11/2022 | Mandry et al. |
| 2022/0374855 A1 | 11/2022 | Balaoro et al. |
| 2022/0391596 A1 | 12/2022 | Yoshikawa |
| 2022/0414347 A1* | 12/2022 | Levy ..................... G06N 20/00 |
| 2023/0197067 A1 | 6/2023 | Robert Jose et al. |
| 2023/0252271 A1* | 8/2023 | Thiele ................... G06N 7/01 |
| | | 706/26 |

* cited by examiner

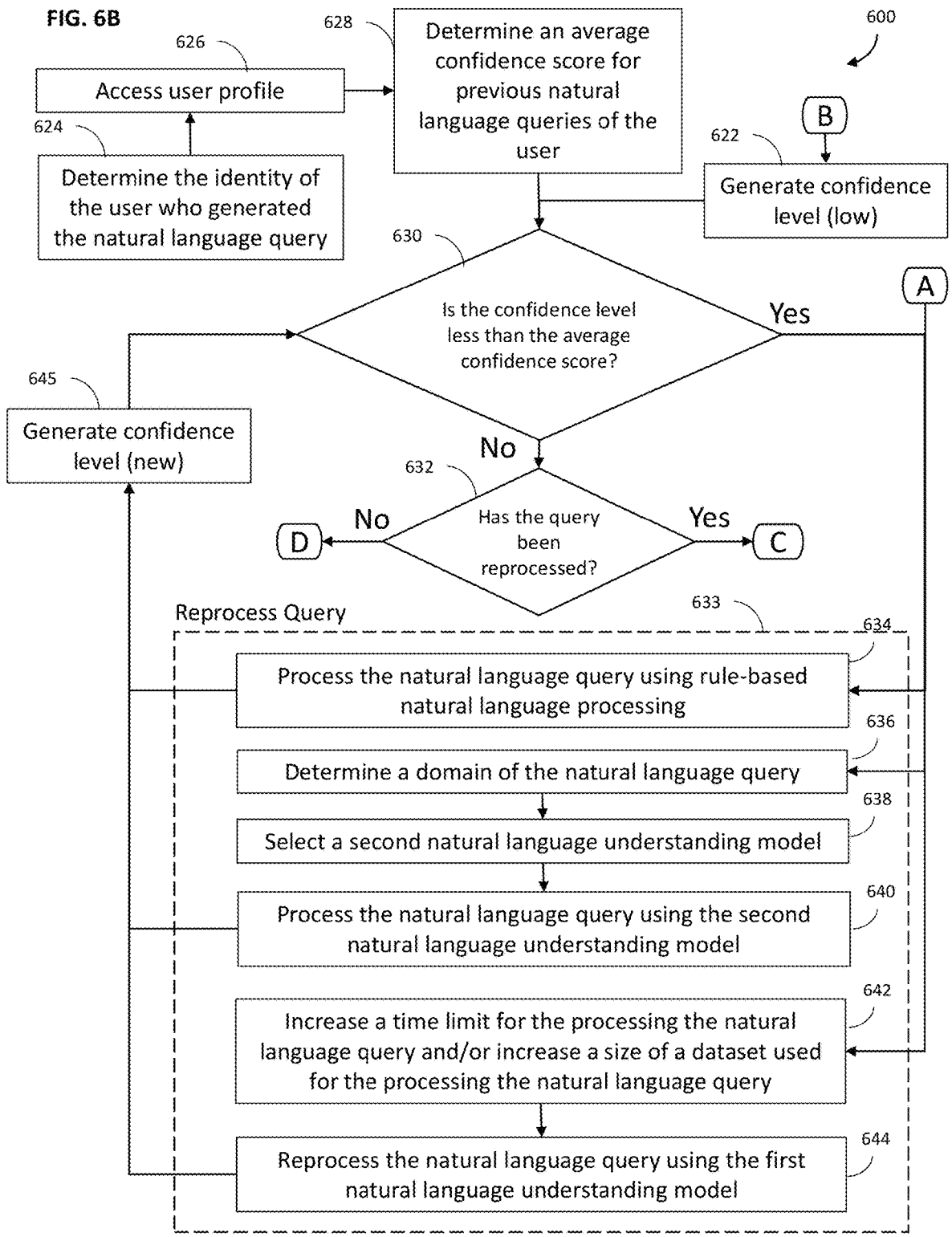

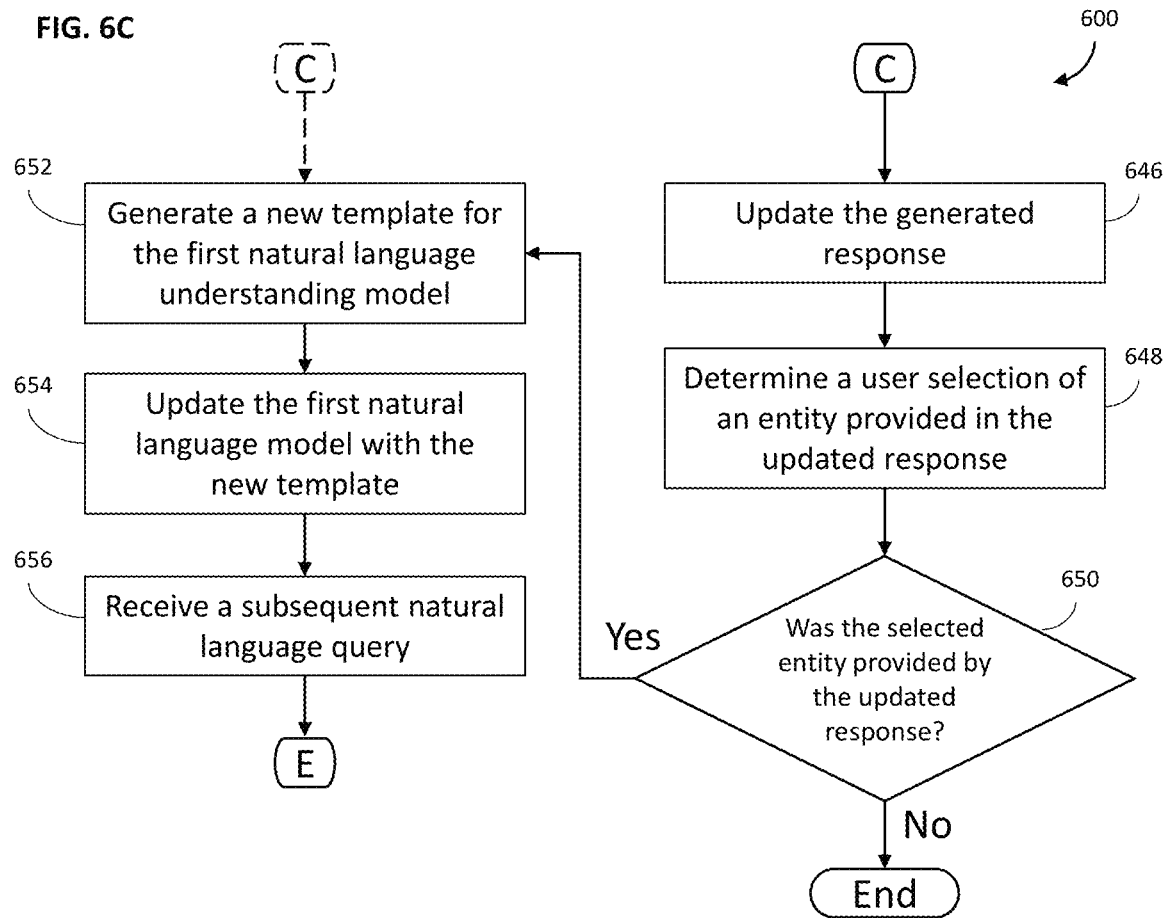

METHODS AND SYSTEMS FOR RESPONDING TO A NATURAL LANGUAGE QUERY

BACKGROUND

The present disclosure relates to methods and systems for responding to a natural language query. Particularly, but not exclusively, the present disclosure relates to training a natural language understanding model and/or providing improved search results in response to a natural language query.

SUMMARY

Natural language understanding (NLU) is used in conversational artificial intelligence (AI) applications to help establish the meaning of a user's query and provide the user with a relevant solution. An important aspect of conversational AI is to understand both the intent of the user's query and the entities in the user's query. However, the manner in which a user constructs a query, and, indeed, how a user sounds, e.g., with respect to language, dialect, tone, etc., can vary dramatically. As such, it is desirable to be able to train an NLU application to be able to provide an improved response from query to query. Moreover, as the prevalence of natural language interaction with user devices increases, it is becoming more important to be able to quickly train an NLU application to ensure that an NLU application understands what the user says before it responds, since misunderstanding of a user's query can lead to increased network traffic and latency when responding to the query, as well as the dissatisfaction of the user.

Systems and methods are provided herein for improving the operation of an NLU system, e.g., by offering support for an increased number of languages and/or by being able to adapt to different types of user queries as a result of the learning capabilities of the NLU system, and by reducing the conflict between providing high quality search results and the speed in which results are returned. Such operational improvements may be realised by implementing the herein described systems and methods for training a NLU model and/or systems and methods for responding to a natural language query.

According to some examples of the systems and methods provided herein, a natural language understanding model is trained by receiving a natural language query, e.g., a first natural language query. A first natural language understanding model is used to process the natural language query. A confidence level, e.g., a first confidence level, of the understanding of the natural language query is determined. In response to the confidence level being below a confidence level threshold, the natural language query is reprocessed using a reprocessing module, which may occur off-line, e.g., after providing a response to the natural language query. The first natural language model is updated based on the reprocessing of the natural language query.

According to some examples of the systems and methods provided herein, a natural language query, e.g., a first natural language query, is received. A first natural language understanding model is used to process the natural language query. A confidence level, e.g., a first confidence level, of the understanding of the natural language query is determined. In response to the confidence level being below a confidence level threshold, the natural language query is reprocessed using a reprocessing module, which may occur in real-time. A response to the natural language query is generated based on the processing of the natural language query by the first natural language understanding model and the reprocessing of the natural language query.

In some examples, a user selection of an entity, e.g., a content item, provided in the response is monitored. In some examples, a determination is made whether the selected entity was provided by the processing the natural language query or by the reprocessing the natural language query. In response to determining that the selected entity was provided by the reprocessing the natural language query, the first natural language understanding model may be updated based on the reprocessing of the natural language query.

In some examples, the reprocessing of the natural language query comprises increasing a time limit for processing the natural language query using the first natural language understanding model. In some examples, the reprocessing of the natural language query comprises increasing a size of a dataset used for processing the natural language query using the first natural language understanding model. The natural language query may be reprocessed using the first natural language understanding model subsequent to increasing the time limit and/or the size of a dataset. In response to reprocessing the natural language query using the first natural language understanding model, a new confidence level of the understanding of the natural language query may be determined.

In some examples, reprocessing the natural language query comprises processing the natural language query using rule-based natural language processing. In response to processing the natural language query using the rule-based natural language processing, a new confidence level of the understanding of the natural language query may be determined.

In some examples, reprocessing the natural language query comprises processing the natural language query using a second natural language understanding model. In response to processing the natural language query using the second natural language understanding model, a new confidence level of the understanding of the natural language query may be determined. In some examples, a domain of the natural language query is determined. The second natural language understanding model may be selected based on the domain of the natural language query.

In some examples, the first natural language understanding model comprises a first template, e.g., onto which the natural language query may be mapped. In some examples, updating the first natural language model comprises generating a new template for the first natural language understanding model. The first natural language model may be updated when the new confidence level is greater than the first confidence level. In some examples, a subsequent natural language query, e.g., that is received after the first natural language query, is processed using the updated natural language understanding model.

In some examples, a response to the natural language query is generated, e.g., based on the processing of the natural language query by the first natural language understanding model and the reprocessing of the natural language query. The reprocessing of the natural language query may be performed by at least the second natural language understanding model.

In some examples, determining the confidence level comprises monitoring, for a predetermined period, user input into a user device, e.g., subsequent to generating the response. The user input may comprise one or more navigation and/or selection inputs performed in a media guidance application. In some examples, the determined user input may be compared to a user input threshold. The user input threshold may comprise a predetermined number of and/or type of user actions, such as a predetermined number of searching/browsing inputs, and/or a predetermined number of selection inputs. In some examples, the user input threshold may be set based on an average number of user inputs that a user performs after receiving a response to a query. In some examples, the confidence level may be determined based on determining that the user input subsequent to generating the response is below the user input threshold.

In some examples, determining the confidence level comprises determining metadata for an entity provided in the response. The metadata for the entity provided in the response may be compared to one or more entities of the natural language query. In some examples, determining the confidence level comprises receiving a user selection of an entity, e.g., a content item, provided in the response. In some examples, determining the confidence level comprises receiving a user selection of an entity, e.g., a content item, not provided in the response and that is manually searched for or navigated to. In some examples, metadata for the user-selected entity is determined. The metadata of the user-selected entity may be compared to one or more entities of the natural language query. In some examples, determining the confidence level comprises determining an average confidence score from a plurality of previous natural language queries, e.g., for a specific user. The confidence level may be compared to the average confidence score. For example, the confidence level may be determined to be high when a maximum difference between the average confidence score and the confidence level is below a threshold value.

In some examples, generating a response to the natural language query is based on processing the natural language query by the first natural language understanding model and reprocessing the natural language query by the reprocessing module. Subsequent to generating the response, one or more user inputs regarding the selection of an entity are monitored. In some examples, the first natural language understanding model is updated in response to determining that the selected entity was provided by reprocessing the natural language query.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6B is a continuation of the flowchart in FIG. 6A; and

FIG. 6C is a continuation of the flowchart in FIGS. 6A and 6B.

DETAILED DESCRIPTION

Figure 1:
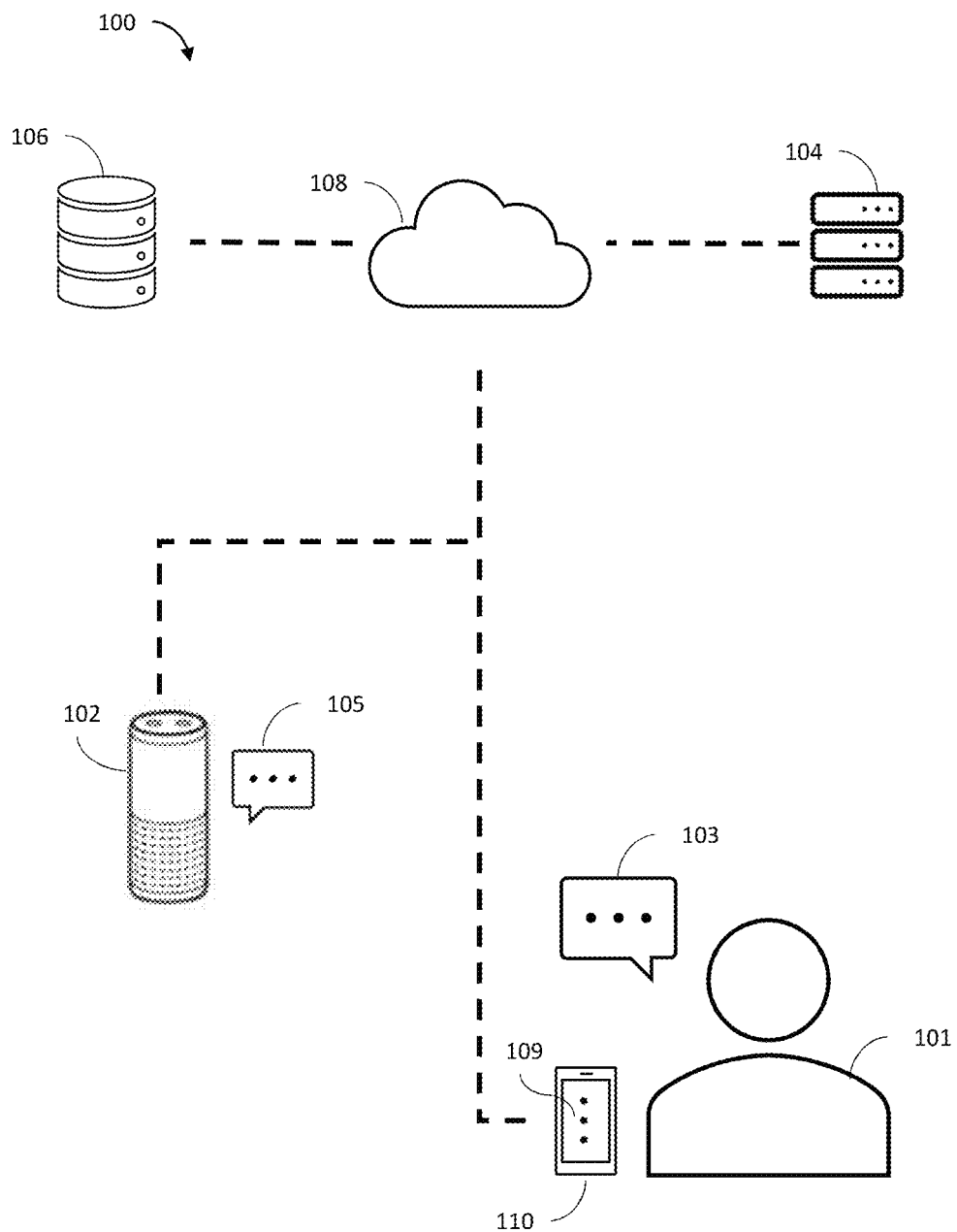
FIG. 1 illustrates an overview of a system for responding to a natural language query, in accordance with some examples of the disclosure.

FIG. 1 illustrates an overview of a system 100 for responding to a natural language query. In particular, the example shown in FIG. 1 illustrates a user 101 interacting with a user device 102, such as a smart speaker, home assistant, a smart TV or a smartphone. However, the user device 102 may be any appropriate type of user device configured to receive a natural language query, e.g., a spoken query 103, from user 101. System 100 may also include network 108 such as the Internet, configured to communicatively couple user device 102 to one or more servers 104 and/or one or more databases 106 from which data, information, content, such as TV shows, movies and/or advertisement content, may be obtained. In some examples, server 104 may be configured to process the natural language query, e.g., using control circuitry, and access database 106 to obtain content for use in providing a response to the natural language query. In the example shown in FIG. 1, system 100 is configured to allow user device 102 to deliver the response, e.g., an audio response 105, to the natural language query. Additionally or alternatively, system 100 may be configured to allow another user device, e.g., a smartphone 110, to deliver the response, e.g., a graphical response 109, to the natural language query. User device 102 (and/or user device 110) and the one or more servers 104 may be communicatively coupled to one another by way of network 108, and the one or more servers 104 may be communicatively coupled to content database 106 by way of one or more communication paths, such as a proprietary communication path and/or network 108. In some examples, server 104 may be a server of a service provider who provides media content for display on user device 102.

The present disclosure, as discussed in detail below, provides improved systems and methods for responding to a natural language query of a user, e.g., by training a first natural language understanding model to deliver a response to a user in a faster and/or more accurate manner. In some examples, the first natural language understanding model is trained by reprocessing a natural language query of a user in response to determining that the first natural language understanding model is unable to deliver a meaningful response to the user query. In the context of the present disclosure, a query that the first natural language understanding model is unable to deliver a meaningful or unsatisfactory response to is referred to as a failed query, e.g., a query having a response below a confidence level threshold. In some example, the reprocessing of a failed query occurs offline, such that the failed query can be run through one or more alternative processing module to generate one or more other interpretations of the query, without further impact on the interaction between the user 101 and the user device 102. Additionally or alternatively, the present disclosure, as discussed in detail below, provides improved systems and methods for responding to a natural language query of a user, e.g., by reprocessing a failed query, e.g., in real-time, as the user 101 is interacting with the user device 102. In this manner, the response to the natural language query may be augmented/supplemented by a response generated by one or more of the reprocessing modules. In some examples, the augmented/supplemented response can be used to train the first natural language understanding model, e.g., as described in the below examples.

In some examples, system 100 may comprise an application that provides guidance through an interface, e.g., a graphical user interface, that allows users to efficiently navigate media content selections, navigate an interactive media content item, and easily identify media content that they may desire, such as content provided on a database on one or more live streams. Such guidance is referred to herein as an interactive content guidance application or, sometimes, a content guidance application, a media guidance application, or a guidance application. In some examples, the application may be configured to provide a recommendation for a content item, e.g., based on a user profile and/or an endorsement profile of the content item. For example, the application may provide a user with a recommendation based for a content item based on one or more endorsements present, e.g., visibly and/or audibly present, in the content item. In some examples, the application provides users with access to a group watching session and/or group communication functionality. For example, the application may provide a user with an option to join a group watching session and participate in group communication with one or more other users participating in the group watching session.

Interactive media guidance applications may take various forms, depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset", "content items" and "content" should each be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate amid and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the examples discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media card, register memory, processor cache, random access memory (RAM), etc.

With the ever-improving capabilities of the Internet, mobile computing, and high-speed wireless networks, users are accessing media on user equipment devices on which they traditionally did not. As referred to herein, the phrases "user equipment device," "user equipment," "user device," "computing device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some examples, the user equipment device may have a front-facing screen and a rear-facing screen, multiple front screens, or multiple angled screens. In some examples, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as online applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, subtitle data, guidance application settings, user preferences, user profile information, media listings, media-related information (e.g., broadcast times, broadcast channels, titles, descriptions, ratings information (e.g., parental control ratings, critics' ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
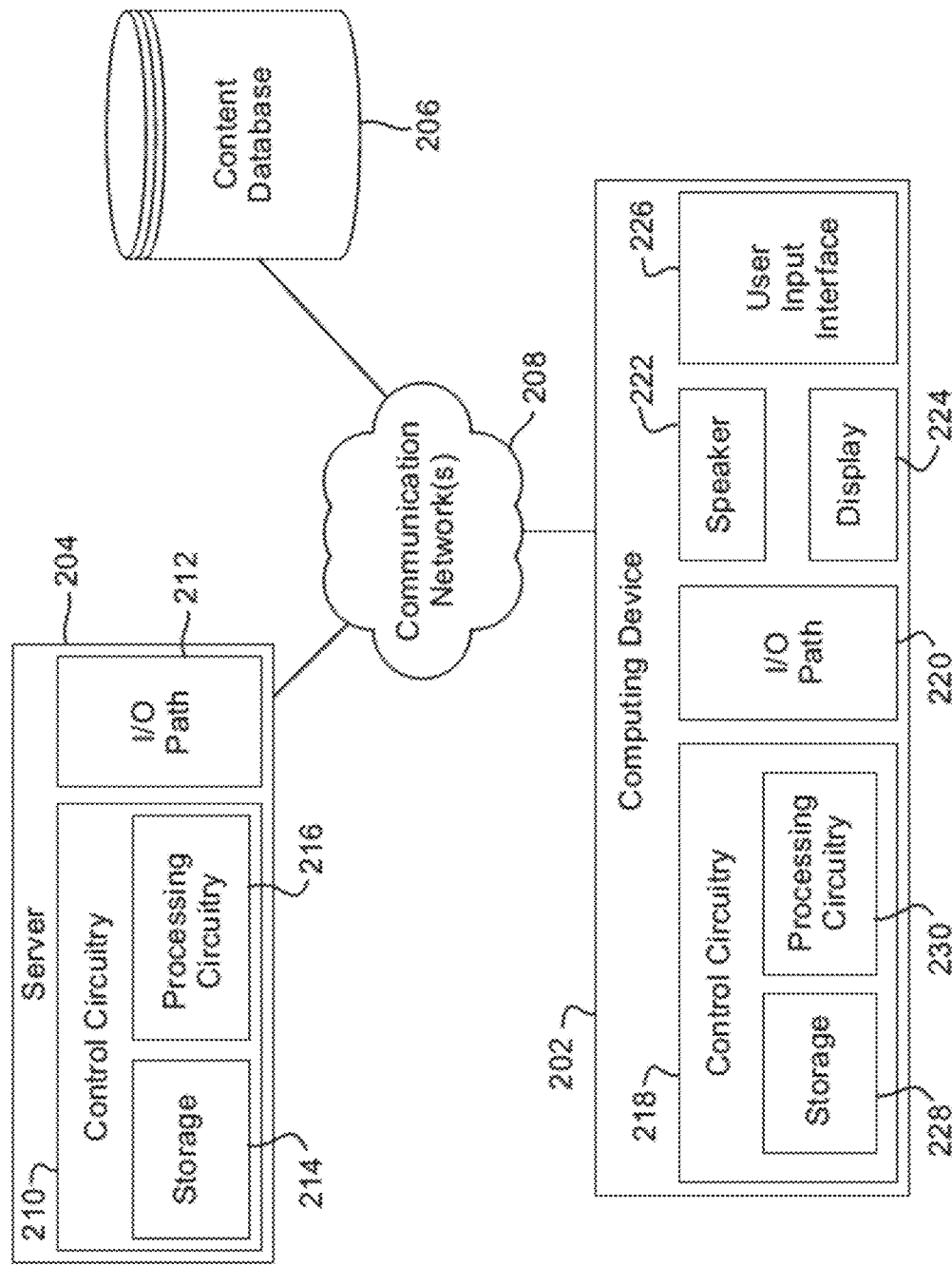
FIG. 2 is a block diagram showing components of an exemplary system for responding to a natural language query, in accordance with some examples of the disclosure.

FIG. 2 is an illustrative block diagram showing exemplary system 200 configured to respond to a natural language query, e.g., by generating an audio response and/or by displaying content on a user device or user devices. Although FIG. 2 shows system 200 as including a number and configuration of individual components, in some examples, any number of the components of system 200 may be combined and/or integrated as one device, e.g., as user device 102. System 200 includes computing device 202, server 204 (e.g., server 106 and/or server 108), and content database 206, each of which is communicatively coupled to communication network 208, which may be the Internet or any other suitable network or group of networks. In some examples, system 200 excludes server 204, and functionality that would otherwise be implemented by server 204 is instead implemented by other components of system 200, such as computing device 202. In still other examples, server 204 works in conjunction with computing device 202 to implement certain functionality described herein in a distributed or cooperative manner.

Server 204 includes control circuitry 210 and input/output (hereinafter "I/O") path 212, and control circuitry 210 includes storage 214 and processing circuitry 216. Computing device 202, which may be a personal computer, a laptop computer, a tablet computer, a smartphone, a smart television, a smart speaker, or any other type of computing device, includes control circuitry 218, I/O path 220, speaker 222, display 224, and user input interface 226, which in some examples provides a user selectable option for enabling and disabling the display of modified subtitles. Control circuitry 218 includes storage 228 and processing circuitry 220. Control circuitry 210 and/or 218 may be based on any suitable processing circuitry such as processing circuitry 216 and/or 220. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, storage 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, storage 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 214 and/or 228 may be instructed by the application to perform the functions discussed herein. In some implementations, any action performed by control circuitry 214 and/or 228 may be based on instructions received from the application. For example, the application may be implemented as software or a set of executable instructions that may be stored in storage 214 and/or 228 and executed by control circuitry 214 and/or 228.

In some examples, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server 204). For example, the remote server may store the instructions for the application in a storage device. The remote server may process the stored instructions using circuitry (e.g., control circuitry 210) and/or generate displays. Computing device 202 may receive the displays generated by the remote server and may display the content of the displays locally via display 224. This way, the processing of the instructions is performed remotely (e.g., by server 204) while the resulting displays, such as the display windows described elsewhere herein, are provided locally on computing device 202. Computing device 202 may receive inputs from the user via input interface 226 and transmit those inputs to the remote server for processing and generating the corresponding displays.

A user may issue a query, e.g., a request to view an interactive media content item and/or select one or more programming options of the interactive media content item, to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server 204 and computing device 202 may transmit and receive content and data via I/O path 212 and 220, respectively. For instance, I/O path 212 and/or I/O path 220 may include a communication port(s) configured to transmit and/or receive (for instance to and/or from content database 206), via communication network 208, content item identifiers, content metadata, natural language queries, and/or other data. Control circuitry 210, 218 may be used to send and receive commands, requests, and other suitable data using I/O paths 212, 220.

Figure 3:
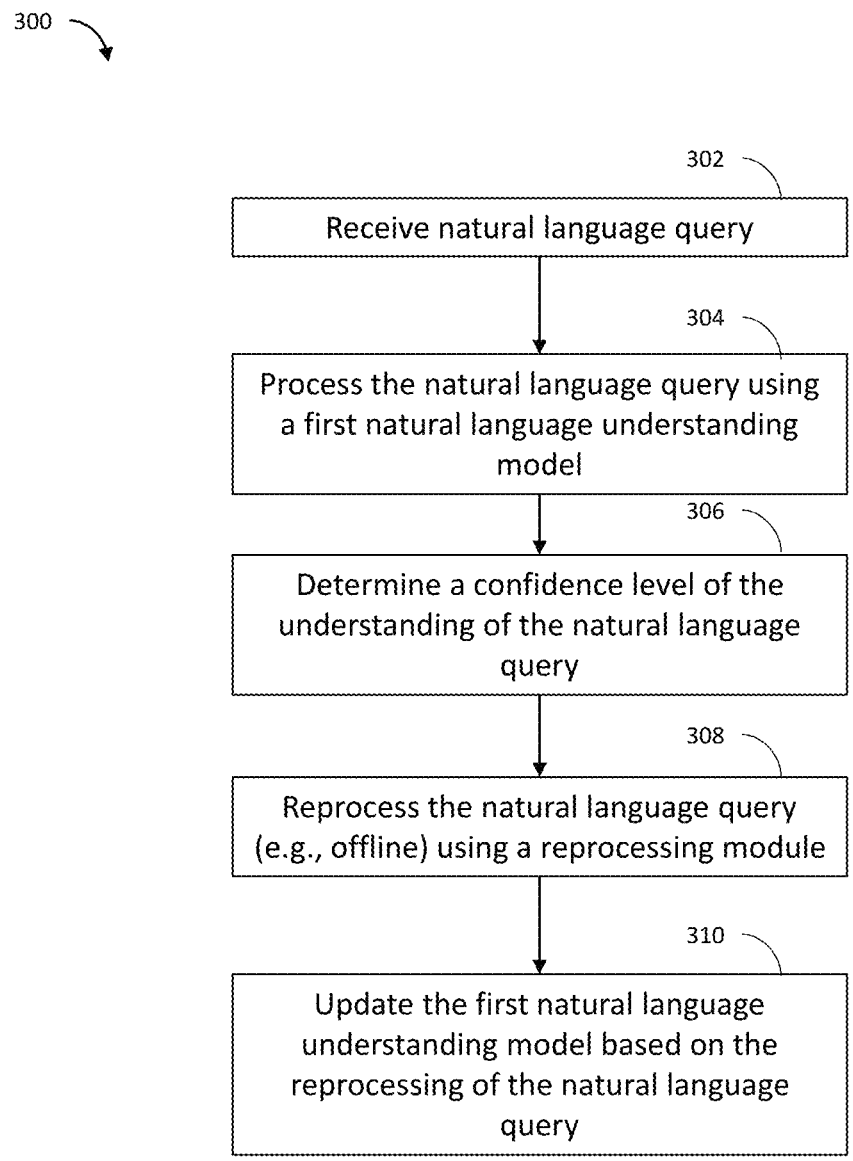
FIG. 3 is a flowchart representing a process for training an NLU model to respond to a natural language query, in accordance with some examples of the disclosure.
Figure 5:
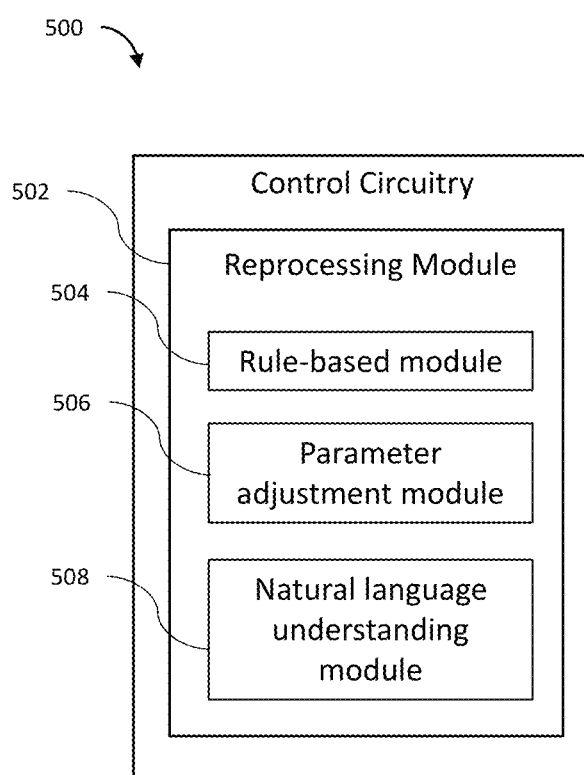
FIG. 5 is a block diagram showing control circuitry of an exemplary system for reprocessing a natural language query, in accordance with some examples of the disclosure.

FIG. 3 is a flowchart representing an illustrative process 300 for training an NLU model to respond to a natural language query, in accordance with some examples of the disclosure. FIG. 5 is a block diagram showing control circuitry of an exemplary system for reprocessing a natural language query. While the below example shown in FIG. 3 refers to the use of system 100, as shown in FIG. 1, and the reprocessing module, as shown in FIG. 5, it will be appreciated that the illustrative process shown in FIG. 3, and any of the other following illustrative processes, may be implemented on system 100, either alone or in combination with any other appropriately configured system architecture, such as system 200 shown in FIG. 2.

At step 302, user device 102 receives a natural language query, e.g., vocal query 103, from user 101. In the example shown in FIG. 1, user device 102 is configured to transmit the query to server 104 via network 108.

At step 304, server 104 receives the query, e.g., using control circuitry, and processes the query using a first NLU model. For example, the first NLU model may be configured to break down the user's query into one or more entities, intents and/or utterances, and map the breakdown of the query against one or more templates in order to understand the query. For example, user 101 may issue query A—"Play Tears of the Sun". In response, the first NLU model may breakdown the query into intent=play, and entity=Tears of the Sun. In such an example, the first NLU model may be able to map the query onto a template intent×entity (movie), and return the movie Tears of the Sun. In some cases, the query may not be quite so clear. For example, the user 101 may issue query B—"I'd like to watch Willis in that Navy SEAL movie". In response, the first NLU model may breakdown the query into utterance=I'd like to watch, intent=watch, entity=Willis, and entity=Navy SEAL movie. In such an example, the first NLU model may be able to map the query onto a template utterance (intent)×intent×entity (movie), and return the movie Tears of the Sun. In other cases, the query may be even less clear. For example, the user 101 may issue query C—"Show me that Bruce Willis war movie". In response, the first NLU model may breakdown the query into utterance=Show me, intent=show, entity=Bruce Willis, and entity=war movie. In such an example, the first NLU model may be able to map the query onto a template utterance (intent)×intent×entity (person)×entity (movie), and return the movie Hart's War. Although not shown in FIG. 3, in response to processing the user's query, control circuitry may then generate and provide to the user a response, e.g., a response comprising one or more search results corresponding to the query, e.g., as described below in more detail with reference to process 600 shown in FIG. 6.

At step 306, control circuitry determines a confidence level of the understanding of the user's natural language query. For example, the confidence level may be based on one or more factors, including, but not limited to: one or more actions of the user 101 after receiving a response to the query, e.g., a user input into a user device, such as a selection of an entity provided in the response and/or navigation though a media guidance application; metadata of one or more entities, e.g., metadata of one or more content items provided in the response; metadata of one or more content items not provided in the response and selected following navigation though a media guidance application. Further detail of how the confidence level is determined is provided below with reference to process 600 shown in FIG. 6.

At step 308, control circuitry reprocesses the natural language query using a reprocessing module 502 (shown in FIG. 5), e.g., in response to the determined confidence level being below a confidence level threshold. In some examples, it is beneficial to perform the reprocessing of the failed query offline, e.g., such that the reprocessing does not affect the latency of providing the user with a response to the query. Further detail of how the confidence level is compared to the confidence level threshold is provided below with reference to process 600 shown in FIG. 6.

In the example shown in FIG. 5, the reprocessing module 502 is provided as part of control circuitry, e.g., control circuitry 210 and/or 218, and comprises one or more modules configured to reprocess the natural language query in a manner different from how the first NLU model processes the natural language query. For example, the reprocessing module 502 may comprise a rule-based module 504, a parameter adjustment module 506 and a natural language understanding module 508.

The rule-based module 504 may be configured to parse the natural language query using i) linguistic rules and patterns, e.g., to identify the structure of a sentence (e.g., subject-verb-object), ii) synonym extraction, e.g., using a thesaurus and/or a list of similar words, and/or iii) sentiment analysis, which analyses linguistic terms to deterministically classify them as positive or negative terms. One advantage of using rule-based processing is that precise results to a query can be returned. However, rule-based processing can be limited by the predetermined rules that are programed into the rule-based module 504 and may take a longer time to process the query than the first NLU model.

The parameter adjustment module 506 may be configured to adjust the manner in which the first NLU model maps the query onto a template. For example, the parameter adjustment module 506 may be configured to adjust a dataset (e.g., decrease/increase the size of a dataset and/or use one or more alternative datasets) used in the processing of the natural language query by the first NLU model. In some cases, it may be inappropriate to use a larger dataset for processing the query at step 304, since processing a larger dataset may increase the computational requirements at a server, and thus increase the time taken to generate a response to the user's query. As such, it may be preferable to perform the reprocessing of the query offline. Additionally or alternatively, the parameter adjustment module 506 may be configured to adjust a time limit (e.g., increase a time limit) for reprocessing the natural language query using the first NLU model. For example, the time limit for the processing of the query at step 304 may be set according to a service level agreement between a service provider and a client, and increasing the time limit for processing the query at step 304 may not be possible, in some cases. As such, it may be preferable to perform the reprocessing of the query offline, where the time limit for the processing of the query may be increased without affecting the latency for the query. In this manner, the first NLU may be able to generate one or more different interpretations of the query when reprocessing the query with adjusted parameters.

The natural language understanding module 508 may be configured to issue an application programming interface (API) call to one or more other systems configured to run a different NLU model (e.g., a second NLU model). For example, the second NLU model may have access to richer data sources, which can improve the granularity at which the model can determine an entity and/or an intent in a query. Additionally or alternatively, the second NLU model may have access to a domain that the first NLU model does not have access to. In this manner, the second NLU model may be able to generate a different interpretation of the query, e.g., by mapping the query onto a template not present in the first NLU model. In some examples, querying a second NLU model may be based on the original query, such that the second NLU model can target a specific part of the original query. For example, a first NLU model may issue query a second NLU model, e.g., in real-time to confirm an intent (intent recognition), an entity (entity recognition) and/or to confirm a sentiment (sentiment analysis), etc.

At step 310, control circuitry is configured to update the first natural language model based on the reprocessing of the natural language query by the reprocessing module 502. For example, where the reprocessing module 502 has generated one or more alternative interpretations of the query, a new template may be generated by the reprocessing module 502. The new template may be used to update the templates of the first NLU model, such that a subsequent query received by user device 102 may be processed in a manner not previously possible. In this manner, the first NLU model is trained, using the reprocessing module, in response to a failed query.

The actions or descriptions of FIG. 3 may be used with any other example of this disclosure, e.g., the example described below in relation to FIGS. 4 and 6. In addition, the actions and descriptions described in relation to FIG. 3 may be done in any suitable alternative orders or in parallel to further the purposes of this disclosure.

Figure 4:
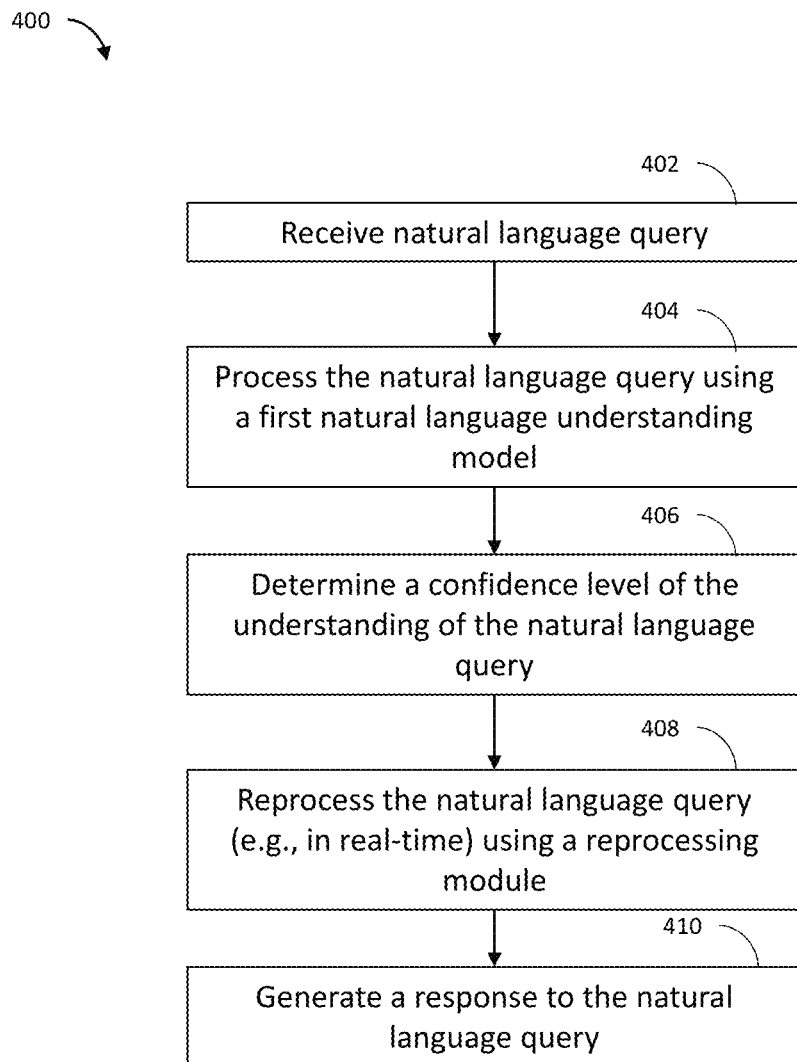
FIG. 4 is a flowchart representing a process for generating a response to a natural language query using an NLU model, in accordance with some examples of the disclosure.

FIG. 4 is a flowchart representing an illustrative process 400 for responding to a natural language query, in accordance with some examples of the disclosure. FIG. 5 is a block diagram showing control circuitry of an exemplary system for reprocessing a natural language query. While the below example shown in FIG. 4 refers to the use of system 100, as shown in FIG. 1, and the reprocessing module, as shown in FIG. 5, it will be appreciated that the illustrative process shown in FIG. 4, and any of the other above or following illustrative processes, may be implemented on system 100, either alone or in combination with any other appropriately configured system architecture, such as system 200 shown in FIG. 2.

At step 402, user device 102 receives a natural language query, e.g., vocal query 103, from user 101, e.g., in a similar manner to that described for step 302 of process 300.

At step 404, server 104 receives the query, e.g., using control circuitry, and processes the query using a first NLU model, e.g., in a similar manner to that described for step 302 of process 300.

At step 406, control circuitry determines a confidence level of the understanding of the user's natural language query, e.g., in a similar manner to that described for step 302 of process 300.

At step 408, control circuitry reprocesses the natural language query using a reprocessing module 502 (shown in FIG. 5), e.g., in response to the determined confidence level being below a confidence level threshold, e.g., in a different manner to that described for step 302 of process 300. One important difference between step 408 and step 308 is that the reprocessing of the query occurs in real-time (not off-line), e.g., so that the output from the reprocessing of the query can be provided to the user along with, e.g., at substantially the same time as, the output from the processing at step 404.

At step 410, control circuitry is configured to generate a response to the query, e.g., by providing to the user one or more search results relating to the query. For example, where the reprocessing module 502 has generated one or more alternative interpretations of the query, the response may be generated based on the processing and the reprocessing of the query. While it is acknowledged that the reprocessing of the query (step 408) may take longer than the processing of the query (step 404), one benefit of providing the output of the reprocessing to the user is that any search results generated as a result of the processing at step 404 may be updated, supplemented or augmented based on the reprocessing at step 408, which can help reduce network traffic resulting from the user performing further user inputs to user device 102, e.g., to perform one or more additional searches. In some examples, a client application (e.g., an application that the user utilizes to issue the query) supports a single page application (SPA) architecture, which would allow the client to receive and automatically provide content in addition to that provided as a result of the processing by the first NLU model without reloading the page. Similarly, the reprocessing module 502 may be configured to send the additional content directly to the client application if the first NLU model and the reprocessing module 502 (and/or the second NLU model) supports the exchange of existing query sessions, e.g., by exchanging device address or other destination data. In some examples, the client application might display an indication to the user that additional information relating to the query is coming. This is useful when the user receives a first set of content to scroll through (e.g., as a result of processing at step 404), and then a second set of content is displayed when available from the reprocessing module 502 (e.g., as a result of reprocessing at step 408).

The actions or descriptions of FIG. 4 may be used with any other example of this disclosure, e.g., the example described below in relation to FIGS. 3 and 6. In addition, the actions and descriptions described in relation to FIG. 4 may be done in any suitable alternative orders or in parallel to further the purposes of this disclosure.

Figure 6A:
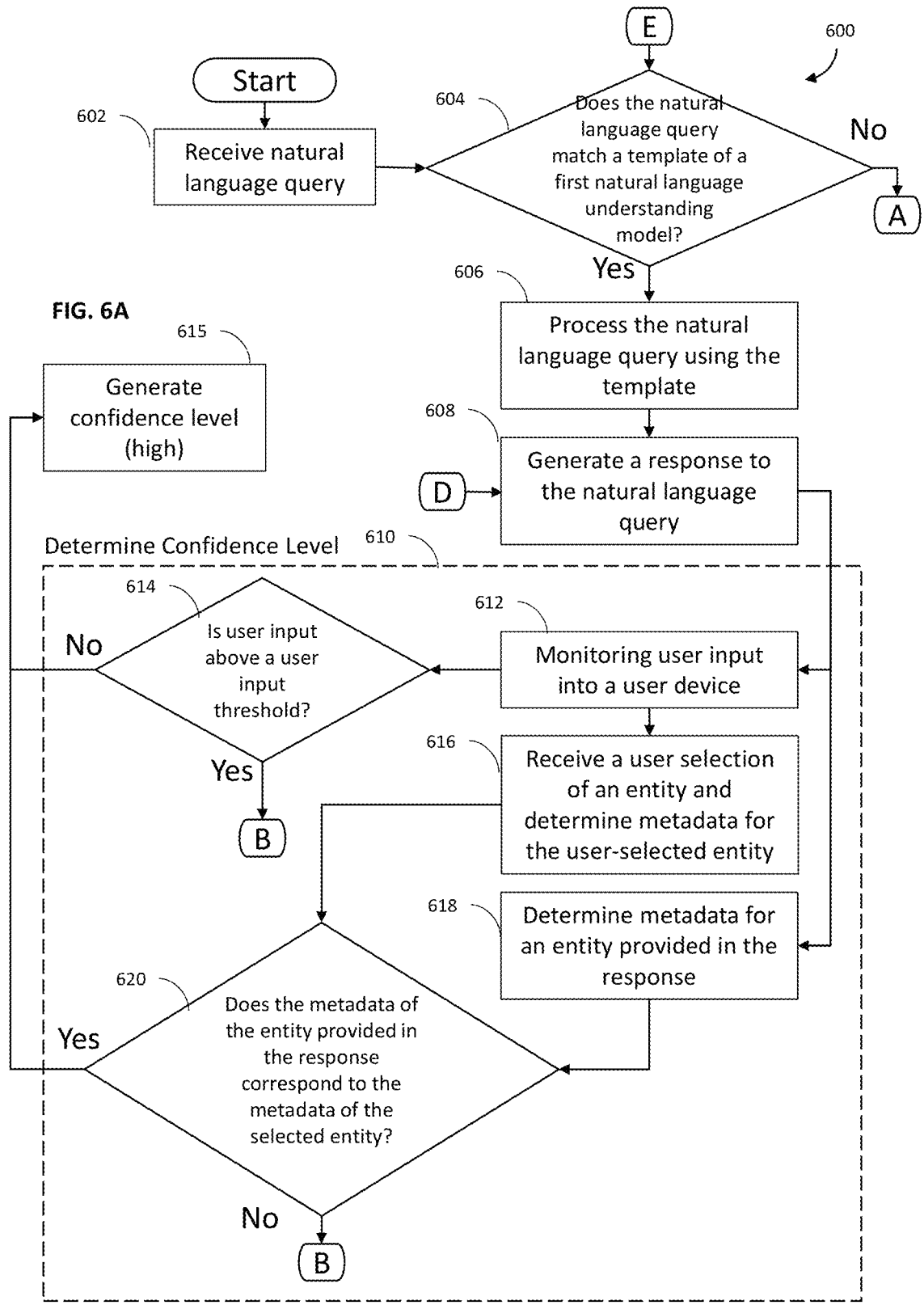
FIG. 6A is a flowchart representing a process for training an NLU model and responding to a natural language query using an NLU model, in accordance with some examples of the disclosure.

FIG. 6 is a flowchart representing an illustrative process 600 for responding to a natural language query, in accordance with some examples of the disclosure. FIG. 5 is a block diagram showing control circuitry of an exemplary system for reprocessing a natural language query. While the below example shown in FIG. 6 refers to the use of system 100, as shown in FIG. 1, and the reprocessing module, as shown in FIG. 5, it will be appreciated that the illustrative process shown in FIG. 6, and any of the other above illustrative processes, may be implemented on system 100, either alone or in combination with any other appropriately configured system architecture, such as system 200 shown in FIG. 2.

At step 602, user device 102 receives a natural language query, e.g., vocal query 103, from user 101, e.g., in a similar manner to that described for step 302 of process 300 and/or step 402 of process 400. For example, the user 101 may issue a query "Show me Bruce's war movie".

At step 604, control circuitry, e.g., control circuitry 210 and/or 218, determines whether the query matches one or more stored query templates, e.g., one or more templates that are stored on storage 214 and/or 228. For example, the first NLU model may breakdown the query into syntactic components, e.g., utterance=Show me, intent=show, entity=Bruce, and entity=war movie, and control circuitry may access a storage module to compare the query breakdown against one or more stored templates, such as Template A—intent×entity (movie), Template B—utterance (intent)×intent×entity (movie) and/or Template C—utterance (intent)×intent×entity (person)×entity (movie). When control circuitry is able to match the query to a template, process 600 moves to step 606, since, in this example, the syntactic components of the query match the components (and/or the order of the components) of Template C. When control circuitry is not able to match the query to one or more templates, process 600 moves to step 633 (see arrow A).

At step 606, the first NLU model processes the natural language query using the matching template. For example, control circuitry may access content database 106 and/or 206 and compare the syntactic components of the query, e.g., the entities of the query, to metadata of one or more content items. For example, control circuitry may compare entity=Bruce and entity=war movie to metadata of content items, and return a match for the movie Robert the Bruce, which is a war movie concerning the historical king of the same name.

At step 608, control circuitry generates a response to the query. For example, the response may be generated as an audio response 105, e.g., "Would you like to watch Robert the Bruce?", and/or as a search result displayed on a screen of user device 102, e.g., as a link to playback the movie Robert the Bruce.

At step 610, control circuitry determines a confidence level of the understanding of the natural language query, e.g., in a similar manner to that described for step 306 of process 300 and/or step 406 of process 400. In the example shown in FIG. 6, step 610 comprises steps 612, 614, 616, 618 and 620. For the avoidance of doubt, step 610 may comprise any appropriate combination of steps 612, 614, 616, 618 and 620. Step 610 is important, since is desirable to determine a confidence level of the understanding of the natural language query to help ensure that the first NLU model has correctly understood the user's intent, e.g., the first NLU model might incorrectly determine a user's intent/ return unexpected results from a given query due to factors such as mispronunciation of an important keyword in the query, and/or the first NLU model predicting the wrong user's intent based on the then-available training dataset for the system, e.g., the then-available templates and/or metadata for the content items. As such, step 610 is implemented to help determine a level of accuracy of the generated response, since users may perform many different types of operations following generating a response. For example, even where the first NLU model has generated accurate results, a user may simply wish to not progress further with playback of a content item returned as part of the response, whereas in other situations, the generated response may be completely inaccurate and not at all what the user expects. In some examples, a user may issue a voice query for content items but then does not interact with the content items that were retrieved by the search system (e.g., does not select them for viewing), rather the user resorts to manual navigation instead. In such an example, NLU system 100 may determine that the query was a failure and may tag the query as a failed query, so that it can be reinterpreted offline and used to retrain the NLU system 100. In some examples, one or more subsequent navigation steps (e.g., using a remote control) within a predetermined period are captured and correlated to the original voice query for retraining purposes. This allows the mapping of the various entities (actor, movie, broadcast time, etc.) present in the original voice query during retraining. For example, a user might issue the voice query "Show me Bruce's war movie". Such a query might result in presenting search results that do not match the user's intent, e.g., by generating a response comprising the movie Robert the Bruce, which is a war movie concerning the historical king of the same name, instead of Tears of the Sun, which is a movie about the Nigerian civil war starring Bruce Willis. For example, the user's intent here was to see the movie Tears of the Sun which features the actor, Bruce Willis. The user might take an action after such a failed query. For example, the user might browse to the on-demand section of their TV service, and type in the name of the movie or a portion of it, or browse by actor, genre, etc. to find the movie and play it. All such data can be used to retrain the NLU system 100. Additionally or alternatively, the accuracy of the mapping of various entities onto the metadata of a content item may be checked against the metadata of an item (including EPG metadata such as broadcast time or availability) that was eventually selected for viewing by the user (e.g., the first selected content item after issuing the original query) to determine whether the words in the query exist in the metadata of the selected content item (e.g., description, list of actors, etc.). This can act as a confirmation step. The confirmation step is important since the user might have decided to browse for some other content items after ignoring the initial results from the first NLU model (results that were returned in response to the user's original voice query). Therefore, the query might not necessarily be classified as a failure and does not need to be used in retraining the NLU system 100. In some examples, the user may select multiple items before deciding to play one. In such a scenario, the metadata associated with the multiple items can be used to attempt mapping the various entities in the voice query (e.g., actor, movie name, broadcast time, etc.). Therefore, multiple selections can be used during the retraining process to perform accurate mapping.

In view of the above, at step 612, control circuitry monitors user input (e.g., a verbal instruction and/or physical operation) to one or more user devices, e.g., user device 102 and/or user device 110. For example, control circuitry may monitor a user's operation of/navigation through a media guidance application, e.g., following the generation of the response to the query at step 608. In some examples, control circuitry monitors a number of and/or type of inputs to the user device. For example, control circuitry may monitor and determine user input to a user device and determine the number of and/or the type of inputs to the user device, e.g., for a predetermined period, e.g., 5 second, or 30 seconds, following generation of the response at step 608. In some cases, the user may perform a series of operations, e.g., scrolling through a list of content items returned as part of the response and/or navigation away from the list of content items returned as part of the response and to other content.

At step 614, control circuitry compares the determined user input, e.g., the number of and/or the type of inputs, to a user input threshold. For example, a user input threshold may be defined by a maximum number of and/or type of inputs to a user device, such as a maximum number of button presses, screens navigated through, operations selected and/ or verbal instructions issued. For example, in response to generating an inaccurate response to the query, a user may operate a media guidance application to scroll through multiple screens, perform manual searches, access content item data (such as a synopsis, cast details, etc.). In some examples, the user input threshold may be set at a maximum number of button presses (e.g., 10 scrolling operations through a list of search results) in combination with the number of times (e.g., 3 times) content item information is accessed for various content items listed in the search results. In this manner, the user input threshold may be set to indicate when a number of actions performed by the user exceeds a likely number of inputs that a user may take when presented with accurate search results. When the user input is above the user input threshold, process 600 moves to step 622 (see arrow B). In some cases, in response to generating an accurate response to the query, a user may operate a media guidance application to select a content item returned as part of the response to the query. For example, a user may select for playback the first of multiple content items presented to the user as part of the response to the query. As such, the number and/or type of user inputs following an accurate query response may be less/fewer than the number and/or type of user inputs following an inaccurate query response. In other words, the manner in which a user responds to the query response generated at step 608 may give an indication of how accurate the query response is. For example, the accuracy of the response generated at step 608 may correlate to the number and/or type of user inputs following the query response being generated at step 608. When the user input is below the user input threshold, process 600 moves to step 615, where control circuitry generates and stores a high confidence level for the query, since the response generated at step 608 is likely to be accurate and the first NLU model does not require training. In some examples, the confidence level generated at step 615 may be used in step determining an average confidence score when processing a subsequent query, e.g., at step 628.

Returning to step 612, the user input to the user device is monitored. At step 616, control circuitry receives a user selection of an entity, e.g., a content item, provided as part of the generated response, and then determines metadata for the user-selected entity. For example, control circuitry may monitor user input into a user device, determine that the user has scrolled through multiple screens, performs a manual search and then receives a user selection of a content item that was not presented as part of the generated response. Using the above example of a response comprising the content item Robert the Bruce, upon receiving the response, the user may navigate away from the response, access a search function of a media guidance application, search for movies starring Bruce Willis, and scroll through a list of search results to find and select the movie Tears of the Sun. In some examples, step 614 is carried out at the same time as, or in response to, step 616. Once control circuitry receives a user selection of the movie Tears of the Sun, control circuitry then accesses metadata for Tears of the Sun for use in determining a confidence level of the generated response.

Additionally or alternatively, at step 618, control circuitry accesses metadata for an entity provided in the response. For example, where the generated response comprises the content item Robert the Bruce, control circuitry then accesses metadata for Robert the Bruce for use in determining a confidence level of the generated response. In some examples, step 618 is carried out at the same time as, or in response to, step 616.

At step 620, control circuitry compares the metadata of the entity provided in the response to the metadata of the selected entity, e.g., to determine a level of accuracy of the generated response. For example, control circuitry may compare metadata (e.g., tags for Bruce Willis, US Navy SEAL, Nigerian civil war, etc.) for the user-selected content item (Tears of the Sun) to metadata (e.g., tags for Robert the Bruce, historical war movie, etc.) for the content item provided as part of the response (Robert the Bruce). In this manner, control circuitry can determine whether there is a correlation between the content item provided as part of the response (Robert the Bruce) and the user-selected content item (Tears of the Sun) to determine a level of accuracy of the generated response. In another example, the generated response may comprise the content item Tears of the Sun, and the user may still choose to navigate away from the generated response, e.g., when they might have changed their mind about wanting to watch Tears of the Sun. As such, step 610 (and sub-steps 612-620) is important in determining whether the generated response is accurate, so that a determination can be made as to whether the generated query response is an accurate response or an inaccurate response (e.g., a failed query). In some examples, the decision on whether to reprocess the query depends on the level of accuracy of the response, e.g., on a correlation between metadata for the user-selected content item and metadata for the content item provided as part of the response. In the above example, the correlation between the metadata for the movie Robert the Bruce and the movie Tears of the Sun may be relatively low, since the two movies share few attributes, whereas the correlation between the metadata for another movie, e.g., Hart's War, and the movie Tears of the Sun may be higher, since they both star Bruce Willis. Thus, at step 620, when correlation between metadata for the user-selected content item and metadata for the content item provided as part of the response meets a minimum predetermined level, process 600 moves to step 615, where control circuitry generates and stores a high confidence level for the query, since the response generated at step 608 is likely to be accurate and the first NLU model does not require training (e.g., the response has been determined to be with an allowable accuracy range), whereas when correlation between metadata for the user-selected content item and metadata for the content item provided as part of the response does not meet a minimum predetermined level, process 600 moves to step 622 (see arrow B).

At step 622, control circuitry generates a confidence level, e.g., a value assigned to the likelihood that the generated response is accurate, based on one or more of steps 612-620. The confidence level for the generated query is stored in a database for later access.

Steps 624, 626, 628, 630 and 632 define a process that can be used to determine if system 100 should send a failed query for reprocessing, e.g., by determining a reinforcement score for the query. The reinforcement score may be used as an indicator for whether to reprocess a failed query, since it may not be desirable to reprocess every failed query, e.g., owing to a computational demand of the reprocessing. As such, process 600 comprises steps, e.g., 624, 626, 628, 630 and 632, that work to optimize the allocation of resource (e.g., to reprocess or to not reprocess) by determining a probability that the reprocessing might provide a different interpretation from the generated response, which can be used to supplement the generated response and/or to retrain the first NLU model.

At step 624, control circuitry determines the identity of the user who generated the natural language query. For example, control circuitry may access a user profile, e.g., at step 626, to determine a user who is signed-in to system 100. In some examples, control circuitry may analyse a vocal signature of a user and compare the vocal signature to one or more stored and labelled vocal signatures to determine the identity of the user who issued a vocal query. Additionally or alternatively, control circuitry may utilize one or more image processing techniques to determine the identity of the user who generated the natural language query, e.g., by analyzing one or more images/videos, which may be captured by a user device, such as user device 102 and/or 104 as the user issues the query.

At step 628, control circuitry determines an average confidence score for previous natural language queries of the identified user. For example, control circuitry may access stored confidence levels, such as those generated at step 615 and/or step 622, for respective previous queries of the user, and determine an average confidence score for the stored confidence levels. In some examples, a high confidence level may be assigned a value=1, and a low confidence level may be assigned a value=0. Alternatively, a confidence level range may be set as appropriate, e.g., a range having appropriate upper and lower limits, e.g., based on the user input threshold and/or a correlation coefficient between the metadata of the entity provided in the response and the metadata of the selected entity. In some examples, the average confidence score (determined as an average of the sum of the confidence levels of respective generated responses) represents the success rate of the previous queries (e.g., queries in a specific domain such as a media domain) that have been processed using the first NLU model (e.g., a primary NLU model). A high average confidence score associated with queries issued by the identified user could indicate that the identified user's queries are normally clear, articulate and concise. Thus, a new query from the identified user that generates a low confidence level compared to the average confidence score might be a query that is suitable for reprocessing (e.g., using at least a secondary NLU model). For example, when a generated confidence level for a query is above (or within a predetermined range of) a threshold confidence score, system 100 may determine to not reprocess the query. Additionally or alternatively, the user profile may record when a user issues a joke query that lack seriousness. For example, sometimes a user may mess around with a digital assistant, e.g., by asking goofy questions, such as "Are you married?", "What's your nationality?", etc. As such, where a new query from the identified user is tagged as a joke query, system 100 may determine to not reprocess the query.

At step 630, control circuitry determines whether the confidence level (generated at 622) is less than the average confidence score (determined at 628). In response to determining that the confidence level is greater than the average confidence score, process 600 moves to step 632, which is described below in more detail. In response to determining that the confidence level is less than the average confidence score, process 600 moves to step 633, where the query is reprocessed.

At step 633, control circuitry reprocesses the query, e.g., in a similar manner to that described for step 308 of process 300 and/or step 408 of process 400. In the example shown in FIG. 6B, step 633 comprises steps 634, 636, 638, 640, 642 and 644, while other examples may comprise any appropriate combination of these steps.

At step 634, reprocessing module 502 reprocesses the query using one or more rule-based modules, e.g., module 504 as described above.

At step 636, reprocessing module 502 determines a domain of the query received at step 602. For example, reprocessing module 502 may determine that the query "Show me the Bruce war movie" relates to a domain comprising actors called Bruce and war movies, e.g., by fitting the query to a template, such as Template D—utterance (intent)×intent×entity (actor)×entity (movie genre).

At step 638, reprocessing module 502 selects a second NLU model based on the determined domain. For example, the reprocessing module 502 may have access to multiple NLU models, some of which may be better suited to processing the query than the first NLU model (and/or others of the multiple NLU models). As such, step 638 acts to increase the probability that the reprocessing of the query returns a more accurate response (e.g., a response having a higher confidence level).

At step 640, the reprocessing module 502 reprocesses the query using the second NLU model, e.g., using NLU module 508 as described above.

At step 642, parameter adjustment module 506 increases a time limit for the processing the natural language query and/or increases a size of a dataset used for the processing the natural language query, e.g., in a similar manner as described above in relation to processes 300 and 400.

At step 644, the query is reprocessed using the first NLU model having one or more adjusted parameters, e.g., in a similar manner as described above in relation to processes 300 and 400.

At step 645, a new confidence level is generated and stored for the reprocessed query, e.g., using methodology similar to that outlined for step 610 above. For example, the low confidence level generated at 622 may have been improved upon by one or more of the reprocessing steps 634-644. Step 645 moves back to step 630, where the new confidence level is compared to the average confidence score.

Returning to step 630, control circuitry determines whether the newly generated confidence level of the reprocessed query is less than the average confidence score. Where the newly generated confidence level of the reprocessed query is still less than the average confidence score, process 600 repeats step 633 and step 645, e.g., until the newly generated confidence level of the reprocessed query is greater than the average confidence score, or until a predetermined number of reprocessing cycles have occurred. Where the newly generated confidence level of the reprocessed query is has increased to be greater than the average confidence score, process 600 moves to step 632.

At step 632, control circuitry determines whether the query has already undergone reprocessing, e.g., as at least part of step 633. For example, where a new query, e.g., the query received at step 602, generates a low confidence level that is not less than the average confidence score, step 632 acts to optimise operational efficiency by determining to not reprocess that query, and process 600 moves to step 608, where the response to the query is generated (see arrow D). However, where the query has been reprocessed to increase the confidence level, e.g., to above the average confidence level, process 600 moves to step 646, or optionally, directly to step 652, (see arrow C).

At step 646, control circuitry updates the response generated at step 608, e.g., with one or more search results having a higher confidence level, e.g., higher accuracy, than search results presented as part of the original response. For example, search results presented as part of the original response may display a user-selectable option to view the movie Robert the Bruce, whereas search results presented as part of the updated response may display user-selectable options to view the movies Robert the Bruce, Tears of the Sun and Hart's War. In some examples, a client application (e.g., an application that the user utilizes to issue the query) supports a single page application (SPA) architecture, which allows the client to receive and automatically display updated/additional response content, e.g., additional content received from the reprocessing module 502, without reloading a page, e.g., a page on which the response generated at step 608 is displayed. In some examples, the reprocessing module 502 may be configured to transmit updated/additional response content directly to the client application if control circuitry for the first NLU model and control circuitry for the reprocessing module 502 support the exchange of existing query sessions (e.g., by exchanging device address or other destination data). In one example, the client application might display an indication that additional information might be coming, e.g., within a certain time frame, which is useful when the user receives a first set of content to scroll through (i.e., the generated response at step 608), and then a second set of content is displayed when available from the reprocessing module 502 (i.e., the generated updated response at step 646).

At step 648, control circuitry monitors user input (e.g., in a similar manner to that described for step 612) and determines a user selection of an entity provided in the updated response. For example, control circuitry may monitor user inputs as the user scrolls through a list of search results comprising one or more content item provided by the processing of the query by the first NLU model (e.g., Robert the Bruce), and one or more other content items provided by the processing of the query by the reprocessing module 502 (e.g., Tears of the Sun and Hart's War).

At step 650, upon user-selection of one of the content items provided as part of the updated response, control circuitry determines whether the selected content item was provided by the processing of the query by the first NLU model or by the processing of the query by the reprocessing module 502. In response to determining that the selected content item was provided by the processing of the query by the first NLU model, process 600 ends. In some examples, control circuitry may store the decision of the user to not select one of the content items provided by the processing of the query by the reprocessing module 502, e.g., so that reprocessing module 502 is able to perform step 633 in a different manner, such as by using a different second NLU model, using one or more different and/or additional rule-based processing methods, and/or by adjusting the parameters used by the first NLU model in a different manner. In this way, a different set of content items may be presented by reprocessing of a similar, subsequent query. In some examples, process 600 may move from step 650 again to step 633 to reprocess the query in a different manner, e.g., to provide a further updated response. On the other hand, in response to determining that the selected content item was provided by the reprocessing of the query by the reprocessing module, process 600 moves to step 652. In some examples, control circuitry may cause display of the user-selected content item following step 648 or step 650.

At step 652, control circuitry generates a new template, e.g., a first new template, for the first natural language understanding model, e.g., based on the user-selection being a content item being provided by the reprocessing of the query by the reprocessing module 502. For example, control circuitry may cause a new template to be generated that corresponds to a template used by the reprocessing module 502 when reprocessing the query. For example, where the reprocessing module 502 used a template that was not available to the first NLU model when originally processing the query (e.g., Template D), control circuitry may generate a new template for the first NLU model that corresponds to Template D. In some examples, process 600 may comprise generating one or more additional new templates based on the first new template. For example, control circuitry may generate one or more additional new templates in a language different from the language of the first new template, which acts to automatically diversify the number and type of templates available to the first NLU model, e.g., without performing any reprocessing steps. In this manner, process 600 acts to predict a future intent of a larger population that has various accents, lives in different geographical areas, demographics, etc. In some examples, control circuitry may group queries in specific domains, by locations and/or by certain demographics since users within the same demographics might search for content in the same manner, style, etc. In some examples, control circuitry defines one or more subsets of users based on historic queries issued in specific domains, by certain locations and/or by certain demographics. In such cases, the average confidence score (used in step 628) may be associated with one or more subsets corresponding to the user's query, such that the confidence level of the generated response can be compared to a confidence score of historic queries from a similar domain, location and/or demographic.

At step 654, control circuitry updates the templates available to the first NLU model with the new template(s), so that the new template(s) can be used by the first NLU model when processing one or more subsequent queries. In this manner, process 600 provides a method of training the first NLU to handle new types of queries, e.g., queries in languages and/or in domains not previously known to the first NLU model.

At step 656, control circuitry receives a subsequent natural language query, where process 600 moves back to step 604, where control circuitry attempts to match the subsequent query to the set of updated templates. In this manner, a continuous process is enabled whereby the first NLU model continues to be trained, such that the accuracy of generated responses may improve upon receiving each subsequent query.

The actions or descriptions of FIG. 6 may be used with any other example of this disclosure, e.g., the example described above in relation to FIGS. 3 and 4. In addition, the actions and descriptions described in relation to FIG. 6 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for training a natural language understanding model, the method comprising:
   receiving, via a user interface of a user device, using control circuitry, a natural language query;
   processing, via the user device, the natural language query using a first natural language understanding (NLU) model to generate first results, wherein the first natural language model comprises a first template of a plurality of templates to which the natural language query is mapped;
   providing, via the user interface of the user device, the first results;
   receiving, via the user interface of the user device, input associated with the first results;

determining, via the user device, using control circuitry, a first NLU confidence level of the understanding of the natural language query based at least in part on the received input associated with the first results wherein determining the first NLU confidence level comprises:
  determining an average confidence score from a plurality of previous natural language queries;
  determining a difference between the confidence level and the average confidence score;
  comparing the difference between the confidence level and the average confidence score to a threshold value; and
  reprocessing the natural language query when the difference between the confidence level and the average confidence score is above a threshold value; and
based at least in part on the first NLU confidence level being below an NLU confidence level threshold, reprocessing, via the user device, the natural language query using an NLU reprocessing module, wherein the reprocessing comprises:
  selecting a second NLU model based on a domain of the natural language query;
  generating using the NLU reprocessing model, a second template associated with the at least one second alternative result generated using the second NLU model;
  based at least in part on the determining that a second NLU confidence level is greater than the first NLU confidence level, updating, via the user device, using control circuitry, the plurality of templates of the first natural language model based on the reprocessing of the natural language query; and
  processing a subsequent natural language query using the updated plurality of templates of the first natural language model.

2. The method of claim 1, wherein the reprocessing of the natural language query comprises:
  at least one of increasing a time limit for the processing the natural language query using the second natural language understanding model, or increasing a size of a dataset used for the processing the natural language query using the second natural language understanding model.

3. The method of claim 1, wherein the reprocessing of the natural language query using the second NLU model comprises:
  processing the natural language query using rule-based natural language processing; and
  determining the second NLU confidence level of the understanding of the natural language query in response to processing the natural language query using the rule-based natural language processing.

4. The method of claim 1, the method comprising generating a response to the natural language query, and wherein determining the first NLU confidence level comprises:
  monitoring, for a predetermined period, the input into the user device subsequent to generating the response; and
  determining that the input subsequent to generating the response is above an input threshold.

5. The method of claim 1, the method comprising generating a response to the natural language query, wherein determining the first NLU confidence level comprises:
  determining metadata for an entity provided in the response;
  comparing the metadata for the entity provided in the response to one or more entities of the natural language query.

6. The method of claim 1, the method comprising generating a response to the natural language query, wherein the determining the first NLU confidence level comprises:
  determining metadata for the input associated with the first results; and
  comparing the metadata of the input associated with the first results to one or more results of the natural language query.

7. A system for training a natural language understanding model, the system comprising control circuitry configured to:
  receiving, via a user interface of a user device, a natural language query;
  process, via the user device, the natural language query using a first natural language understanding (NLU) model to generate first results, wherein the first natural language model comprises a first template of a plurality of templates to which the natural language query is mapped;
  provide, via the user interface, the first results;
  receive, via the user interface, input associated with the first results;
  determine, via the user device, a first NLU confidence level of the understanding of the natural language query based at least in part on the received input associated with the first results wherein the control circuitry configured to determine the first NLU confidence level is further configured to:
    determine an average confidence score from a plurality of previous natural language queries;
    determine a difference between the confidence level and the average confidence score;
    compare the difference between the confidence level and the average confidence score to a threshold value; and
    reprocess the natural language query when the difference between the confidence level and the average confidence score is above a threshold value; and
  based at least in part on the first NLU confidence level being below an NLU confidence level threshold, reprocess, via the user device, the natural language query using an NLU reprocessing module, wherein the control circuitry configured to reprocess the natural language query is further configured to:
    select a second NLU model based on a domain of the natural language query;
    generate using the NLU reprocessing model, a second template associated with the at least one second alternative result generated using the second NLU model;
    based at least in part on the determining that a second NLU confidence level is greater than the first NLU confidence level, update, via the user device, the plurality of templates of the first natural language model based on the reprocessing of the natural language query; and
    process a subsequent natural language query using the updated plurality of templates of the first natural language model.

8. The system of claim 7, wherein the control circuitry is configured to:
  at least one of increase a time limit for the processing the natural language query using the second natural language understanding model, or increase a size of a dataset used for the processing the natural language query using the second natural language understanding model.

9. The system of claim 7, wherein the control circuitry is configured to:
   process the natural language query using rule-based natural language processing; and
   determine the second NLU confidence level of the understanding of the natural language query in response to processing the natural language query using the rule-based natural language processing.

10. The system of claim 7, wherein the control circuitry is configured to:
    generate a response to the natural language query;
    monitor, for a predetermined period, the input into the user device subsequent to generating the response; and
    determine that the input subsequent to generating the response is above an input threshold.

11. The system of claim 7, wherein the control circuitry is configured to:
    generate a response to the natural language query;
    determining metadata for an entity provided in the response;
    comparing the metadata for the entity provided in the response to one or more entities of the natural language query.

12. The system of claim 7, wherein the control circuitry is configured to:
    generate a response to the natural language query;
    determine metadata for the input associated with the first results; and
    compare the metadata of the input associated with the first results to one or more results of the natural language query.

* * * * *